United States Patent [19]

Maus et al.

[11] Patent Number: 4,620,356

[45] Date of Patent: Nov. 4, 1986

[54] METHOD FOR FASTENING DRIVE ELEMENTS ON A CYLINDRICAL SHAFT

[75] Inventors: Wolfgang Maus; Helmut Swars, both of Bergisch-Gladbach, Fed. Rep. of Germany

[73] Assignee: Interatom GmbH, Bergisch-Gladbach, Fed. Rep. of Germany

[21] Appl. No.: 761,058

[22] Filed: Jul. 31, 1985

[30] Foreign Application Priority Data

Aug. 3, 1984 [DE] Fed. Rep. of Germany ....... 3428733

[51] Int. Cl.⁴ .............................................. B23P 11/00
[52] U.S. Cl. ...................................... 29/432; 29/520; 29/525; 29/526 R; 74/567; 248/410; 403/373
[58] Field of Search ................... 29/520, 525, 526 R, 29/432; 248/410; 403/DIG. 7, 373, 374, 377; 74/567

[56] References Cited

U.S. PATENT DOCUMENTS

| 1,460,749 | 7/1923 | Dull | 29/520 UX |
|---|---|---|---|
| 1,829,657 | 10/1931 | Jones | 403/377 |
| 2,564,372 | 8/1951 | Phelps et al. | 29/520 |
| 2,904,876 | 9/1959 | Edelen | 29/520 X |
| 3,012,799 | 12/1961 | Mayne et al. | |
| 3,312,115 | 4/1967 | Braselmann | 248/410 X |
| 3,402,947 | 9/1968 | Lewis | 248/410 X |
| 3,597,835 | 8/1971 | Scaillet | 29/520 X |
| 4,054,190 | 10/1977 | Wilkes | 248/410 X |
| 4,343,563 | 8/1982 | Bernhagen | |
| 4,345,850 | 8/1982 | Baumann | 403/373 X |
| 4,385,431 | 5/1983 | Holton | 29/526 R X |
| 4,486,116 | 12/1984 | Sassi | 403/374 X |

FOREIGN PATENT DOCUMENTS

| 682168 | 11/1939 | Fed. Rep. of Germany . |
|---|---|---|
| 1479745 | 7/1969 | Fed. Rep. of Germany . |
| 2914095 | 10/1980 | Fed. Rep. of Germany . |
| 1117816 | 6/1968 | United Kingdom . |

OTHER PUBLICATIONS

Germany Gebrauchsmuster No. 7920 957, 7-1979.

Primary Examiner—Charlie T. Moon
Attorney, Agent, or Firm—Herbert L. Lerner; Laurence A. Greenberg

[57] ABSTRACT

A method of producing a drive shaft with drive elements on a cylindrical basic part includes forming a desired contour for a drive element on pairs of discs, forming holes in the discs of each pair having axes being inclined relative to the surfaces of the discs and having inclinations being opposite to and mirror images of each other, pushing the discs onto a cylindrical basic part with the disc of each pair being congruent to each other, and pressing the discs of each pair together until they are substantially perpendicular to the longitudinal axis of the basic part.

7 Claims, 5 Drawing Figures

METHOD FOR FASTENING DRIVE ELEMENTS ON A CYLINDRICAL SHAFT

The invention relates to a method of producing a drive shaft with a cylindrical basic part and drive elements such as cams, gears or bearings pushed thereon.

Camshafts for controlling internal combustion engines may be produced as one integral forging with bearing surfaces that are later machined in a costly manner. It is also known to make camshafts out of a round or possibly prismatic bar or basic part, over which the cams that are made of appropriately shaped stamping, are pushed and subsequently connected to the basic part, such as by shrinking, welding or screwing, as disclosed in German Petty Patent DE-U-79 20 957. In any event, in such devices fixing the cams on the basic shaft occurs in a second operation after sliding them on and positioning them. The problem therefore arises of keeping the cams in their position which necessarily must be maintained very accurately during the handling which may be required between the two operations. The invention is analogously applicable to other drive elements, i.e. parts with a circular contour, that are concentric to the base part and constructed as a gear or bearing for the shaft.

It is accordingly an object of the invention to provide a method of fastening drive elements on cylindrical shafts, which overcomes the hereinafore-mentioned disadvantages of the heretofore-known devices of this general type, and to do so in such a way that the pushed-on drive elements can be, at least temporarily fixed on the cylindrical basic part in one operation, so that the assembled structure can be handled for transport to other operations.

With the foregoing and other objects in view there is provided, in accordance with the invention, a method of producing a drive shaft with drive elements such as cams, gears or bearings on a cylindrical basic part, which comprises forming a desired contour for a drive element on pairs of discs, forming holes in the discs of each pair having axes being non-perpendicular or being inclined relative to the surfaces of the discs and having inclinations being directed opposite to and mirror images of each other, pushing the discs onto a cylindrical basic part with the disc of each pair being congruent to each other, and pressing the discs of each pair together until they are substantially perpendicular to the longitudinal axis of the basic part. Stampings which have been produced by the manufacturing process known as "precision blanking" are recommended as those from which the drive elements can be obtained. This is because such stampings are of great dimensional accuracy and have clean sheared surfaces which make it essentially unnecessary to remachine the surfaces interacting with other elements. However, such parts can only be stamped in limited thicknesses so that in order to obtain a drive element of the usual width, several of these parts are needed. The parts must be placed congruently on top of each other and subsequently connected to each other. It presents no problem to select the number of such individual discs or cams in pairs (even though the individual discs of a pair need not necessarily be of the same thickness) and to do so in such a manner that two parts are provided in mirror fashion each time with the hole which is oblique to the plane of the disc and through which hole the basic part is pushed. When the discs which are kept in oblique position on the basic part are subsequently brought into their intended plane perpendicular to the shaft axis by the use of force, the disc edges will notch the surface of the basic part, thereby fixing the discs thereon.

Under certain circumstances, this fixation suffices to retain the drive element formed in this manner on the shaft, even during operation. If this is not the case, there is provided a method which comprises conventionally welding the discs to the basic body after pressing the discs together. In any case, the drive element is secured well enough so that it no longer changes its position on the shaft while being transported, for instance, to a welding machine, and there is no need to employ other means for this purpose.

In accordance with a further feature of the invention there is provided a method which comprises conventionally forming a knurl or the like on a surface of each of the discs to be contacted by the basic part, prior to pushing the discs onto the basic part. In this way a better notching effect and therefore a safer fastening can be obtained.

In accordance with still another feature of the invention there is provided a method of producing a drive shaft with drive elements such as cams, gears or bearings on a cylindrical basic part, which comprises forming a desired contour for a drive element on a pair of discs, forming holes in the discs of the pair having axes being non-perpendicular or being inclined relative to the surfaces of the discs and having inclinations being directed opposite to and mirror images of each other, loosely pushing at least one other part over a cylindrical basic part, pushing the discs onto the cylindrical basic part enclosing the other part with the discs of the pair being congruent to each other, and pressing the discs of the pair toward each other until they are substantially perpendicular to the longitudinal axis of the basic part. In this way only the outer parts of a drive element to be fixed on the basic part need be constructed in the above-described manner, while the ones inbetween may be pushed over the shaft relatively loosely for retention by the end discs.

In accordance with a concomitant feature of the invention, there is provided a method which comprises form-locking the discs to the other part with fastening means. This is done in order to hold these central parts in their azimuthal position. A multiplicity of connections to the end disc may be employed, among them being those providing material or force-lock connections. However, the form-lock fastening is recommended. A form-locking connection is one in which parts are locked against each other by virtue of their shapes, while force is applied for locking in a force-locking connection.

Other features which are considered as characteristic for the invention are set forth in the appended claims.

Although the invention is illustrated and described herein as embodied in a method of fastening drive elements on a cylindrical shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
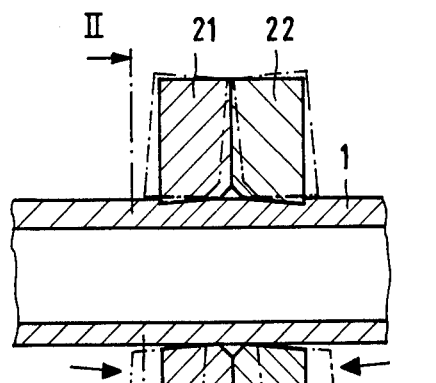
FIG. 1 is a fragmentary, diagrammatic, axial-sectional view of a first embodiment according to the invention.
Figure 2:
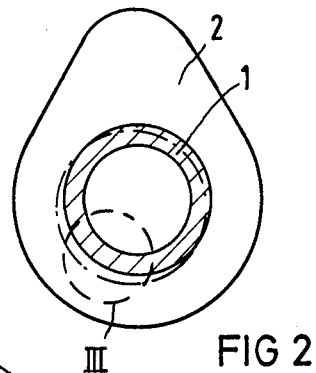
FIG. 2 is a transverse-sectional view of the first embodiment, taken along the line II—II of FIG. 1, in the direction of the arrows.
Figure 3:
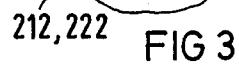
FIG. 3 is a fragmentary, enlarged view of the portion III of FIG. 2.

Referring now to the figures of the drawings in detail in which the position of the individual parts prior to the execution of the method is indicated by phantom lines in each case, and first, particularly to FIGS. 1 and 2 thereof, there is seen a camshaft which is formed of a cylindrical basic part 1 which may be hollow and may be made of a relatively soft material because the surfaces of cams 2 (or of similar drive elements such as gears or bearings) that are subject to wear are produced separately; this is done by pushing discs 21, 22 of the cam 2 that are stamped in pairs over the basic part 1. These parts have a hole provided therein for receiving the basic part 1, which is inclined relative to the plane of the discs or of the surface thereof. Therefore, the discs first assume the position thereof shown in phantom. The basic part 1 is pushed through the appropriate holes in the parts 21, 22 while the parts are held in any non-illustrated plier-type tools. If opposing forces are subsequently applied to the jaws of these pliers in the direction of the arrows in FIG. 1, the disc-shaped parts will assume their final position shown in solid lines, with their edges digging into the surface of the basic part 1. This occurs because they are made of a harder material in accordance with their intended use as parts that are subjected to wear. In order to improve the notching effect, the discs 21, 22 may be provided with a knurl or another surface structure 212, 222 having the same effect, as shown in FIG. 3.

Figure 4:
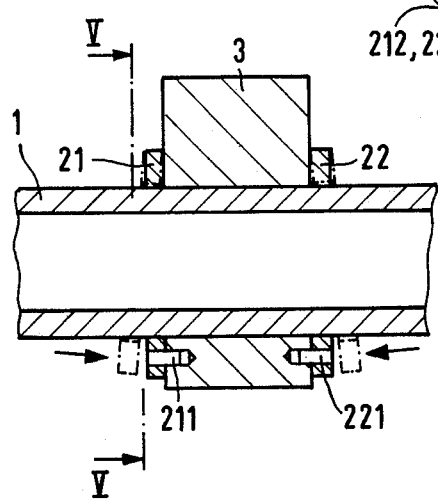
FIG. 4 is a fragmentary axial-sectional view of a second embodiment according to the invention.
Figure 5:
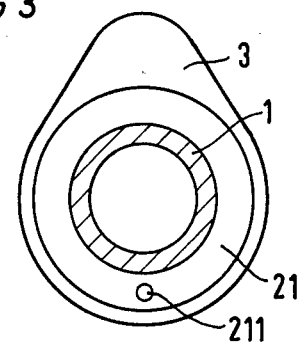
FIG. 5 is a transverse-sectional view taken along the line V—V of FIG. 4, in the direction of the arrows.

In the embodiment according to FIGS. 4 and 5, the discs 21, 22 do not form any part of the cam contour themselves, but they only serve for the axial fastening of the actual cam 3 clamped therebetween. In order to also fix the cam 3 in the azimuthal direction, pins 211, 221 are provided which additionally engage corresponding recesses in the part 3 after loosely pushing at least one part 3 on the basic part 1 and pushing the discs 21, 22 in the direction of the arrows.

The foregoing is a description corresponding in substance to German Application P 34 28 733.7, dated Aug. 3, 1984, the International priority of which is being claimed for the instant application, and which is hereby made part of this application. Any material discrepancies between the foregoing specification and the aforementioned corresponding German application are to be resolved in favor of the latter.

We claim:

1. Method of producing a drive shaft with drive elements on a cylindrical basic part, which comprises forming peripheral driving surfaces for a drive element on pairs of discs, forming circular holes in the discs of each pair of substantially the same diameter as the cylindrical basic part and having axes being inclined relative to the surfaces of the discs and having inclinations being opposite to and mirror images of each other, pushing the discs onto a cylindrical basic part with the discs of each pair being congruent to each other with the holes in the discs concentric with the outer surface of the cylindrical part and having the inclinations opposite to and mirror images of each other, and pressing the discs of each pair together until they are substantially perpendicular to the longitudinal axis of the basic part and dig into the outer surface thereof.

2. Method according to claim 1, which comprises welding the discs to the basic body after pressing the discs together.

3. Method according to claim 1, which comprises soldering the discs to the basic body after pressing the discs together.

4. Method according to claim 1, which comprises cementing the discs to the basic body after pressing the discs together.

5. Method according to claim 1, which comprises forming a knurl on a surface of each of the discs to be contacted by the basic part, prior to pushing the discs onto the basic part.

6. Method of producing a drive shaft with drive elements on a cylindrical basic part, which comprises forming a pair of discs, forming circular holes in the discs of the pair of substantially the same diameter as the cylindrical basic part and having axes being inclined relative to the surfaces of the discs and having inclinations being opposite to and mirror images of each other, loosely pushing at least one other part having a peripheral driving surface over a cylindrical basic part, pushing the discs onto the cylindrical basic part enclosing the other part with the discs of the pair being congruent to each other with the holes in the discs concentric with the outer surface of the cylindrical part and having the inclinations opposite to and mirror images of each other, and pressing the discs of the pair toward each other until they are substantially perpendicular to the longitudinal axis of the basic part and dig into the outer surface thereof.

7. Method according to claim 6, which comprises locking the discs to the other part with fastening means.

* * * * *